US007470343B2

(12) United States Patent
Kronzer

(10) Patent No.: US 7,470,343 B2
(45) Date of Patent: Dec. 30, 2008

(54) HEAT TRANSFER MASKING SHEET MATERIALS AND METHODS OF USE THEREOF

(75) Inventor: Francis J. Kronzer, Woodstock, GA (US)

(73) Assignee: Neenah Paper, Inc., Alpharetta, GA (US)

( * ) Notice: Subject to any disclaimer, the term of this patent is extended or adjusted under 35 U.S.C. 154(b) by 328 days.

(21) Appl. No.: 11/026,408

(22) Filed: Dec. 30, 2004

(65) Prior Publication Data

US 2006/0283540 A1 Dec. 21, 2006

(51) Int. Cl.
*B32B 15/00* (2006.01)

(52) U.S. Cl. ....................... 156/230; 156/230; 156/235; 156/277; 101/492

(58) Field of Classification Search ................. 156/230, 156/235, 277; 101/492
See application file for complete search history.

(56) References Cited

U.S. PATENT DOCUMENTS

| | | | |
|---|---|---|---|
| 1,858,673 | A | 5/1932 | Lawrence |
| 3,359,127 | A | 12/1967 | Meyer et al. |
| 3,616,176 | A | 10/1971 | Jackimowicz |
| 3,790,439 | A | 2/1974 | LaPerre et al. |
| 3,872,040 | A | 3/1975 | Mollohan et al. |
| 3,922,435 | A | 11/1975 | Asnes |
| 3,984,273 | A | 10/1976 | Said |
| 4,021,591 | A | 5/1977 | DeVries et al. |
| 4,107,365 | A | 8/1978 | Reed et al. |
| 4,167,414 | A | 9/1979 | Morgan |
| 4,224,358 | A | 9/1980 | Hare |
| 4,235,657 | A | 11/1980 | Greenman et al. |
| 4,240,807 | A | 12/1980 | Kronzer |
| 4,303,717 | A | 12/1981 | Andrews |

(Continued)

FOREIGN PATENT DOCUMENTS

| | | |
|---|---|---|
| DE | 2842139 A1 | 4/1979 |

(Continued)

OTHER PUBLICATIONS

ASTM Designation: E-28-99, "Standard Test Methods for Softening Point of Resins Derived from Naval Stores by Ring-and-Ball Apparatus", Dec. 1999, pp. 1-6.

(Continued)

*Primary Examiner*—Philip C Tucker
*Assistant Examiner*—Kimberly K McClelland
(74) *Attorney, Agent, or Firm*—William D. Herrick

(57) ABSTRACT

In one embodiment, a method of applying an image to a substrate includes the steps of: imaging a printable surface with an image to form an imaged surface having a printed area and a non-printed area; positioning a masking sheet comprising an outer masking layer adjacent the imaged surface such that the outer masking layer is in contact with the imaged surface; transferring a corresponding portion of the outer masking layer to the printed area of the imaged surface, leaving a negative image mask on the masking sheet; transferring the negative image mask to a transfer layer of a heat transfer paper to form a heat transfer paper having a masked portion corresponding to the negative image mask and an unmasked portion; and transferring the unmasked portion corresponding to the printed area to a substrate. Other methods of making and using negative image masks are also disclosed.

23 Claims, 5 Drawing Sheets

U.S. PATENT DOCUMENTS

| | | | | |
|---|---|---|---|---|
| 4,322,467 | A | 3/1982 | Heimbach et al. | |
| 4,351,871 | A | 9/1982 | Lewis et al. | |
| 4,383,878 | A | 5/1983 | Young et al. | |
| 4,399,209 | A | 8/1983 | Sanders et al. | |
| 4,496,618 | A | 1/1985 | Pernicano | |
| 4,517,237 | A | 5/1985 | Pernicano | |
| 4,536,434 | A | 8/1985 | Magnotta | |
| 4,548,857 | A | 10/1985 | Galante | |
| 4,664,735 | A | 5/1987 | Pernicano | |
| 4,757,047 | A | 7/1988 | Kosaka | |
| 4,758,952 | A | 7/1988 | Harris, Jr. et al. | |
| 4,773,953 | A | 9/1988 | Hare | |
| 4,775,657 | A | 10/1988 | Harrison et al. | |
| 4,786,349 | A | 11/1988 | Mahn, Sr. | |
| 4,863,781 | A | 9/1989 | Kronzer | |
| 4,929,501 | A | 5/1990 | Okada et al. | |
| 4,966,815 | A | 10/1990 | Hare | |
| 4,980,224 | A | 12/1990 | Hare | |
| 5,006,502 | A | 4/1991 | Fujimura et al. | |
| 5,019,475 | A | 5/1991 | Higashiyama et al. | |
| 5,028,028 | A | 7/1991 | Yamada et al. | |
| 5,053,267 | A | 10/1991 | Ide et al. | |
| 5,059,580 | A | 10/1991 | Shibata et al. | |
| 5,064,743 | A | 11/1991 | Koshizuka et al. | |
| 5,087,527 | A | 2/1992 | Shimura et al. | |
| 5,110,389 | A | 5/1992 | Hiyoshi et al. | |
| 5,132,277 | A | 7/1992 | Kaszczuk et al. | |
| 5,139,917 | A | 8/1992 | Hare | |
| 5,141,915 | A | 8/1992 | Roenigk et al. | |
| 5,147,489 | A * | 9/1992 | Scrutton et al. | 156/235 |
| 5,151,326 | A | 9/1992 | Matsuda et al. | |
| 5,236,801 | A | 8/1993 | Hare | |
| 5,242,739 | A | 9/1993 | Kronzer et al. | |
| 5,248,543 | A | 9/1993 | Yamaguchi et al. | |
| 5,252,531 | A | 10/1993 | Yasuda et al. | |
| 5,252,533 | A | 10/1993 | Yasuda et al. | |
| 5,263,781 | A | 11/1993 | Mima et al. | |
| 5,264,279 | A | 11/1993 | Imamura et al. | |
| 5,271,990 | A | 12/1993 | Kronzer et al. | |
| 5,286,521 | A | 2/1994 | Matsuda et al. | |
| 5,310,589 | A | 5/1994 | Nagashima | |
| 5,318,943 | A | 6/1994 | Ueno et al. | |
| 5,332,713 | A | 7/1994 | Oldfield et al. | |
| 5,334,439 | A | 8/1994 | Kawaguchi et al. | |
| 5,338,603 | A | 8/1994 | Mahn, Sr. et al. | |
| 5,342,739 | A | 8/1994 | Katou et al. | |
| 5,356,853 | A | 10/1994 | Ueno et al. | |
| 5,362,703 | A | 11/1994 | Kawasaki et al. | |
| 5,366,251 | A | 11/1994 | Brandt et al. | |
| 5,372,987 | A | 12/1994 | Fisch et al. | |
| 5,372,988 | A | 12/1994 | Takeuchi et al. | |
| 5,387,574 | A | 2/1995 | Campbell et al. | |
| 5,407,724 | A | 4/1995 | Mimura et al. | |
| 5,413,841 | A | 5/1995 | Mahn, Sr. et al. | |
| 5,419,944 | A | 5/1995 | Sammis | |
| 5,427,997 | A | 6/1995 | Oshima et al. | |
| 5,431,501 | A | 7/1995 | Hale et al. | |
| 5,432,258 | A | 7/1995 | Yoshimura | |
| 5,444,037 | A | 8/1995 | Imai et al. | |
| 5,484,644 | A | 1/1996 | Imamura et al. | |
| 5,501,902 | A | 3/1996 | Kronzer | |
| 5,508,105 | A | 4/1996 | Orensteen et al. | |
| 5,571,766 | A | 11/1996 | Imai et al. | |
| 5,614,345 | A | 3/1997 | Gumbiowski et al. | |
| 5,616,155 | A | 4/1997 | Kronzer | |
| 5,647,935 | A | 7/1997 | Hoshino et al. | |
| 5,654,080 | A | 8/1997 | Hayashi et al. | |
| 5,660,928 | A | 8/1997 | Stokes et al. | |
| 5,670,448 | A | 9/1997 | Kometani | |
| 5,677,049 | A | 10/1997 | Torii | |
| 5,679,616 | A * | 10/1997 | Payne | 503/227 |
| 5,707,925 | A | 1/1998 | Akada et al. | |
| 5,716,477 | A | 2/1998 | Yamaguchi et al. | |
| 5,716,900 | A | 2/1998 | Kronzer et al. | |
| 5,741,387 | A | 4/1998 | Coleman | |
| 5,770,268 | A | 6/1998 | Kuo et al. | |
| 5,776,854 | A | 7/1998 | Hayashi | |
| 5,789,134 | A | 8/1998 | Brault et al. | |
| 5,798,161 | A | 8/1998 | Kita et al. | |
| 5,798,179 | A | 8/1998 | Kronzer | |
| 5,846,367 | A | 12/1998 | Omote et al. | |
| 5,861,355 | A | 1/1999 | Olson et al. | |
| 5,876,836 | A | 3/1999 | Imamura et al. | |
| 5,879,813 | A | 3/1999 | Tanaka et al. | |
| 5,880,065 | A | 3/1999 | Hayashi et al. | |
| 5,885,928 | A | 3/1999 | Hirano et al. | |
| 5,891,824 | A | 4/1999 | Simpson et al. | |
| 5,895,557 | A | 4/1999 | Kronzer | |
| 5,897,735 | A | 4/1999 | Peskin | |
| 5,898,018 | A | 4/1999 | Hirano et al. | |
| 5,925,712 | A | 7/1999 | Kronzer | |
| 5,942,335 | A | 8/1999 | Chen et al. | |
| 5,945,375 | A | 8/1999 | Kronzer | |
| 5,948,586 | A | 9/1999 | Hare | |
| 5,962,149 | A | 10/1999 | Kronzer | |
| 5,981,045 | A | 11/1999 | Kuwabara et al. | |
| 5,981,077 | A | 11/1999 | Taniguchi | |
| 6,017,636 | A | 1/2000 | Tada et al. | |
| 6,020,397 | A | 2/2000 | Matzinger | |
| 6,033,739 | A | 3/2000 | Kronzer | |
| 6,043,194 | A | 3/2000 | Saito et al. | |
| 6,054,223 | A | 4/2000 | Tsuchiya et al. | |
| 6,066,387 | A | 5/2000 | Ueda et al. | |
| 6,071,368 | A | 6/2000 | Boyd et al. | |
| 6,083,656 | A | 7/2000 | Hare et al. | |
| 6,083,872 | A | 7/2000 | Adkins | |
| 6,087,061 | A | 7/2000 | Hare et al. | |
| 6,096,475 | A | 8/2000 | Hare et al. | |
| 6,103,364 | A | 8/2000 | Harris et al. | |
| 6,113,725 | A | 9/2000 | Kronzer | |
| 6,139,672 | A | 10/2000 | Sato et al. | |
| 6,177,187 | B1 | 1/2001 | Niemoller et al. | |
| 6,180,219 | B1 | 1/2001 | Hoshino et al. | |
| 6,200,668 | B1 | 3/2001 | Kronzer | |
| 6,210,794 | B1 | 4/2001 | Nakamura | |
| 6,214,149 | B1 | 4/2001 | Nakano et al. | |
| 6,232,267 | B1 | 5/2001 | Oshima et al. | |
| 6,232,268 | B1 | 5/2001 | Narita et al. | |
| 6,245,710 | B1 | 6/2001 | Hare et al. | |
| 6,251,824 | B1 | 6/2001 | Ueno et al. | |
| 6,265,053 | B1 | 7/2001 | Kronzer et al. | |
| 6,277,229 | B1 | 8/2001 | Popat et al. | |
| 6,281,166 | B1 | 8/2001 | Kronzer | |
| 6,290,798 | B1 | 9/2001 | Onishi et al. | |
| 6,294,307 | B1 | 9/2001 | Hare et al. | |
| 6,309,495 | B1 * | 10/2001 | Lakes | 156/227 |
| 6,335,307 | B1 | 1/2002 | Imai et al. | |
| 6,346,313 | B1 | 2/2002 | Cook | |
| 6,350,508 | B1 | 2/2002 | Ueno et al. | |
| 6,358,600 | B1 | 3/2002 | Hayashi et al. | |
| 6,358,660 | B1 | 3/2002 | Agler et al. | |
| 6,383,710 | B2 | 5/2002 | Hare et al. | |
| 6,395,375 | B1 | 5/2002 | Imamura et al. | |
| 6,410,200 | B1 | 6/2002 | Williams et al. | |
| 6,423,466 | B2 | 7/2002 | Hare et al. | |
| 6,428,878 | B1 | 8/2002 | Kronzer | |
| 6,432,549 | B1 | 8/2002 | Kronzer | |
| 6,450,633 | B1 | 9/2002 | Kronzer | |
| 6,465,393 | B1 | 10/2002 | Nakano et al. | |
| 6,482,285 | B2 | 11/2002 | Cross | |
| 6,497,781 | B1 | 12/2002 | Dalvey et al. | |
| 6,509,131 | B2 | 1/2003 | Hare et al. | |
| 6,531,216 | B1 | 3/2003 | Williams et al. | |
| 6,551,692 | B1 | 4/2003 | Dalvey et al. | |

| | | | | |
|---|---|---|---|---|
| 6,582,803 | B2 | 6/2003 | Cole et al. | |
| 6,593,406 | B2 | 7/2003 | Sargeant et al. | |
| 6,613,412 | B1 | 9/2003 | Dressler | |
| 6,984,281 | B2 * | 1/2006 | Oshima et al. | 156/235 |
| 2002/0081420 | A1 | 6/2002 | Kronzer | |
| 2002/0102391 | A1 | 8/2002 | Kronzer | |
| 2002/0146544 | A1 | 10/2002 | Kronzer | |
| 2002/0153110 | A1 | 10/2002 | Yamaguchi et al. | |
| 2003/0008116 | A1 | 1/2003 | Williams et al. | |
| 2003/0021962 | A1 | 1/2003 | Mukherjee et al. | |

FOREIGN PATENT DOCUMENTS

| | | | |
|---|---|---|---|
| EP | 0241212 | A2 | 10/1987 |
| EP | 0241212 | A3 | 10/1987 |
| EP | 0266094 | A1 | 5/1988 |
| EP | 0466503 | A1 | 1/1992 |
| EP | 0652114 | B1 | 1/1998 |
| EP | 0842786 | A1 | 5/1998 |
| EP | 0850786 | A2 | 7/1998 |
| EP | 0933226 | A2 | 8/1999 |
| EP | 1219460 | A2 | 7/2002 |
| EP | 1232874 | A1 | 8/2002 |
| EP | 1020299 | B1 | 4/2003 |
| EP | 1316435 | A1 | 6/2003 |
| EP | 1340626 | A1 | 9/2003 |
| EP | 1344653 | A1 | 9/2003 |
| FR | 2442721 | A | 8/1980 |
| GB | 1487599 | | 10/1977 |
| GB | 1529637 | | 10/1978 |
| GB | 1529637 | A | 10/1978 |
| GB | 2084931 | A | 4/1982 |
| GB | 2147614 | A | 5/1985 |
| GB | 2243332 | A | 10/1991 |
| JP | 01208192 | A | 8/1989 |
| JP | 03010879 | A | 1/1991 |
| JP | 6-155995 | A | 6/1994 |
| JP | 06312573 | A | 11/1994 |
| JP | 2002-079767 | A | 3/2002 |
| WO | WO 87/04393 | | 7/1987 |
| WO | WO 90/00473 | | 1/1990 |
| WO | WO 91/06433 | | 5/1991 |
| WO | WO 9114207 | A1 | 9/1991 |
| WO | WO 92/22857 | | 12/1992 |
| WO | WO 93/21561 | | 10/1993 |
| WO | WO 95/08419 | | 3/1995 |
| WO | WO 96/10491 | | 4/1996 |
| WO | WO 97/01448 | | 1/1997 |
| WO | WO 97/33763 | | 9/1997 |
| WO | WO 98/43821 | | 10/1998 |
| WO | WO 99/25917 | | 5/1999 |
| WO | WO 00/59733 | | 10/2000 |
| WO | WO 00/64685 | | 11/2000 |
| WO | WO 00/73570 | | 12/2000 |
| WO | WO 01/03941 | | 1/2001 |
| WO | WO 01/12448 | | 2/2001 |
| WO | WO 01/17792 | | 3/2001 |
| WO | WO 01/23664 | | 4/2001 |
| WO | WO 01/62514 | | 8/2001 |
| WO | WO 02/36353 | | 5/2002 |
| WO | WO 02/55311 | | 7/2002 |
| WO | WO 03/06736 | | 1/2003 |
| WO | WO 03066337 | A2 | 8/2003 |
| WO | WO 03066337 | A3 | 8/2003 |

OTHER PUBLICATIONS

ASTM Designation: D-1238-00, "Standard Test Method for Melt Flow Rates of Thermoplastics by Extrusion Plastometer", Nov. 2000, pp. 1-12.

Search Report and Written Opinion for PCT/US2005/010770, Sep. 28, 2005.

Search Report and Written Opinion for PCT/US2005/010495, Apr. 18, 2006.

* cited by examiner

HEAT TRANSFER MASKING SHEET MATERIALS AND METHODS OF USE THEREOF

BACKGROUND OF THE INVENTION

In recent years, a significant industry has developed which involves the application of customer-selected designs, messages, illustrations, and the like (referred to collectively hereinafter as "images") on articles of clothing, such as T-shirts, sweat shirts, and the like. These images may be commercially available products tailored for a specific end-use and printed on a release or transfer paper, or the customer may generate the images on a heat transfer paper. The images may be transferred to the article of clothing by means of heat and pressure, after which the release or transfer paper is removed.

Heat transfer papers having an enhanced receptivity for images made by wax-based crayons, thermal printer ribbons, ink-jet printers, laser-jet printers, and impact ribbon or dot-matrix printers, are well known in the art. Typically, a heat transfer material includes a cellulosic base sheet and an image-receptive coating on a surface of the base sheet. The image-receptive coating usually contains one or more film-forming polymeric binders, as well as, other additives to improve the transferability and printability of the coating. Other heat transfer materials include a cellulosic base sheet and an image-receptive coating, wherein the image-receptive coating is formed by melt extrusion or by laminating a film to the base sheet. The surface of the coating or film may then be roughened by, for example, passing the coated base sheet through an embossing roll.

Much effort has been directed at generally improving the transferability of an image-bearing laminate (coating) to a substrate. For example, an improved cold-peelable heat transfer material has been described in U.S. Pat. No. 5,798,179, which allows removal of the base sheet immediately after transfer of the image-bearing laminate ("hot peelable heat transfer material") or some time thereafter when the laminate has cooled ("cold peelable heat transfer material"). Moreover, additional effort has been directed to improving the crack resistance and washability of the transferred laminate. The transferred laminate must be able to withstand multiple wash cycles and normal "wear and tear" without cracking or fading.

Various techniques have been used in an attempt to improve the overall quality of the transferred laminate and the article of clothing containing the same. For example, plasticizers and coating additives have been added to coatings of heat transfer materials to improve the crack resistance and washability of image-bearing laminates on articles of clothing.

Heat transfer papers generally are sold in standard printer paper sizes, for example, 8.5 inches by 11 inches. Graphic images are produced on the transferable surface or coating of the heat transfer paper by any of a variety of means, for example, by ink-jet printer, laser-jet printer, laser-color copier, other toner-based printers and copiers, and so forth. The image and the transferable surface are then transferred to a substrate such as, for example, a cotton T-shirt. In some circumstances it is desirable that the transferable surface only transfer in those areas where there is a graphic image, thus reducing the overall area of the substrate that is coated with the transferable coating. Some papers have been developed that are "weedable", that is, portions of the transferable coating can be removed from the heat transfer paper prior to the transfer to the substrate. Weeding involves cutting around the printed areas and removing the coating from the extraneous non-printed areas. However, such weeding processes can be difficult to perform, especially around intricate graphic designs. Other methods have been developed for transferring the extraneous non-printed areas using release sheet materials such as disclosed in U.S. patent application Ser. No. 10/894,841 entitled "HEAT TRANSFER MATERIALS AND METHOD OF USE THEREOF", filed Jul. 20, 2004. However, such methods are generally applicable only to transfer images to light colored fabrics or other substrates. Therefore, there remains a need in the art for improved weedable dark fabric heat transfer papers and methods of application. Desirably, the papers and methods provide good image appearance and durability.

SUMMARY OF THE INVENTION

In accordance with one embodiment, a method of applying an image to a substrate is disclosed that includes the steps of: a) imaging a printable surface with an image to form an imaged surface having a printed area and a non-printed area; b) positioning a masking sheet comprising an outer masking layer adjacent the imaged surface such that the outer masking layer is in contact with the imaged surface; c) transferring a corresponding portion of the outer masking layer to the printed area of the imaged surface, leaving a negative image mask on the masking sheet; d) transferring the negative image mask to a transfer layer of a heat transfer paper to form a heat transfer paper having a masked portion of the transfer layer corresponding to the negative image mask and an unmasked portion of the transfer layer; and e) transferring the unmasked portion of the transfer layer to a substrate. As one example, the transfer layer may be a meltable polymer layer. Optionally, the transfer layer of the heat transfer paper may be imaged with a copy of the image prior to transfer of the negative image mask to the transfer layer. Care should be taken to align the copy of the image with the negative image mask.

The transferring steps are desirably performed by application of heat and pressure to the sheet materials. By way of example only, the application of heat and pressure may be performed by hand ironing, heat press, and so forth.

The imaging step is desirably performed by application of toner particles, for example by laser-jet copier, laser-jet printer, and so forth. The printable surface may be, for example, the surface of a piece of paper.

In one aspect, the outer masking layer includes a powdered particulate material. The powdered particulate material may be selected from the group consisting of, for example, powdered thermoplastic polymers, clay, diatomaceous earth, talc, fillers, calcium carbonate, and so forth. If the particulate material is a meltable polymer, the step of transferring a corresponding portion of the outer masking layer to the printed area of the imaged surface, leaving a negative image mask on the masking sheet is desirably performed at a temperature below the melting point of the thermoplastic particles. Additionally, if the particulate material is a meltable polymer, the step of transferring the negative image mask to a transfer layer of a heat transfer paper to form a heat transfer paper having a masked portion of the transfer layer corresponding to the negative image mask and an unmasked portion of the transfer layer is desirably performed at a temperature below the melting point of the thermoplastic particles.

In another embodiment, a method of applying an image to a substrate includes the steps of: a) imaging a printable surface with an image to form an imaged surface having a printed area and a non-printed area; b) positioning a masking sheet comprising an outer masking layer adjacent the imaged surface such that the outer masking layer is in contact with the imaged surface; c) transferring a corresponding portion of the outer masking layer to the printed area of the imaged surface, leaving a negative image mask on the masking sheet; d) transferring the negative image mask to a clear transfer layer of a heat transfer paper to form a heat transfer paper having a masked portion of the transfer layer corresponding to the negative image mask and an unmasked portion of the transfer layer corresponding to the image; e) imaging the unmasked portion of the transfer layer with a copy of the image; and f) transferring the imaged unmasked portion of the transfer layer to a substrate.

In a further embodiment, a method of applying an image to a substrate includes the steps of: a) imaging a printable surface with an image to form an imaged surface having a printed area and a non-printed area; b) positioning a masking sheet comprising an optional release layer and an outer masking layer, the outer masking layer positioned adjacent the imaged surface such that the outer masking layer is in contact with the imaged surface; c) transferring a corresponding portion of the outer masking layer to the printed area of the imaged surface, leaving a negative image mask on the masking sheet; d) transferring the negative image mask to a substrate to create a masked area and an unmasked area on the surface of the substrate; e) imaging the unmasked area on the surface of the substrate; f) thereafter, removing the negative image mask from the substrate.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
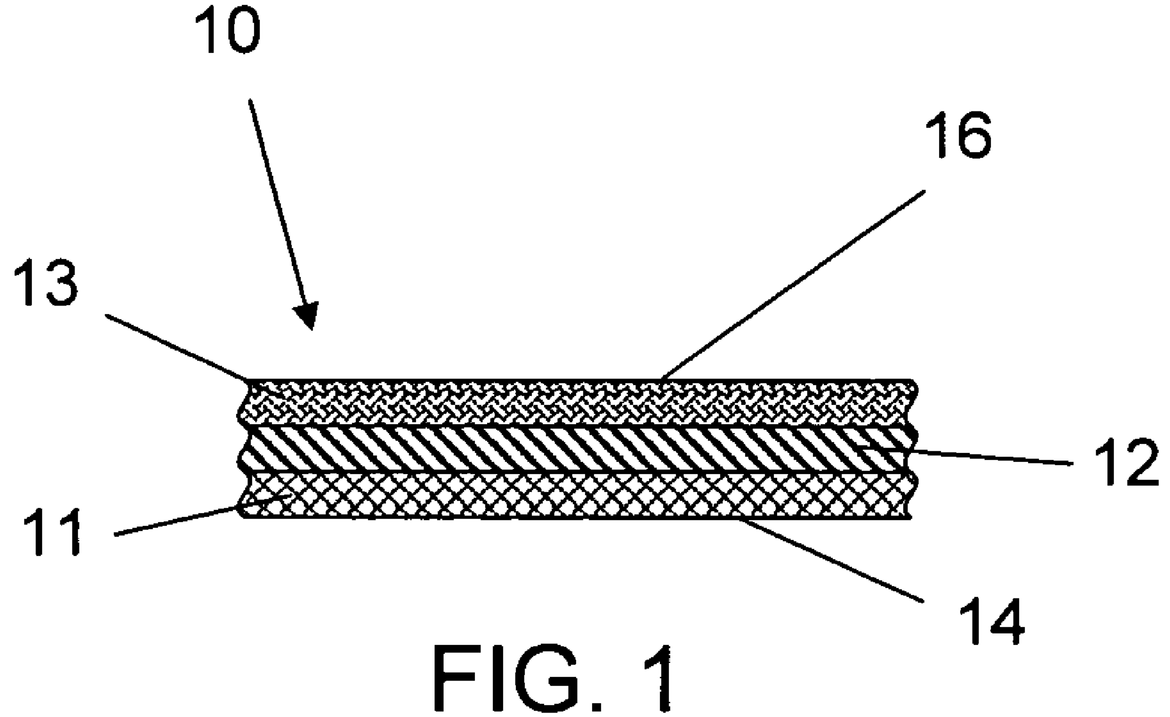
FIG. 1 is a fragmentary sectional view of a heat transfer masking sheet material made in accordance with the present invention.

Repeat use of reference characters in the present specification and drawings is intended to represent same or analogous features or elements of the invention.

DETAILED DESCRIPTION OF REPRESENTATIVE EMBODIMENTS

Reference will now be made in detail to embodiments of the invention, one or more examples of which are provided herein. Each example is provided by way of explanation of the invention and not meant as a limitation of the invention. For example, features illustrated or described as part of one embodiment may be utilized with another embodiment to yield still a further embodiment. It is intended that the present invention include such modifications and variations as come within the scope of the appended claims and their equivalents.

Definitions

As used herein, the term "printable" is meant to include enabling the placement of an image on a material by any means, such as by direct and offset gravure printers, silk-screening, typewriters, laser printers, laser copiers, other toner-based printers and copiers, dot-matrix printers, and ink jet printers, by way of illustration. Moreover, the image composition may be any of the inks or other compositions typically used in printing processes.

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic polymer" is used herein to mean any polymer which softens and flows when heated; such a polymer may be heated and softened a number of times without suffering any basic alteration in characteristics, provided heating is below the decomposition temperature of the polymer. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly (acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly(e-caprolactam), poly(hexamethylene adipamide), poly (hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenylene-isopropylidene-1,4-phenylene) and poly(sulfonyl-1,4-phenyleneoxy-1,4-phenylenesulfonyl-4,4'-biphenylene); polycarbonates, such as poly(bisphenol A) or poly (carbonyidioxy-1,4-phenyleneisopropylidene-1,4-phenylene); polyesters, such as poly(ethylene terephthalate), poly(tetramethylene terephthalate), and poly-(cyclohexylene-1,4-dimethylene terephthalate) or poly(oxymethylene-1,4-cyclohexylenemethyleneoxyterephthaloyl); polyaryl sulfides, such as poly(p-phenylene sulfide) or poly(thio-1,4-phenylene); polyimides, such as poly(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly (4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; copolymers of the foregoing, such as acrylonitrile-butadiene-styrene (ABS) copolymers; and the like.

The term “hard acrylic polymer” as used herein is intended to mean any acrylic polymer which typically has a glass transition temperature ($T_g$) of at least about 0 degrees Celsius. For example, the $T_g$ may be at least about 25 degrees Celsius. As another example, the $T_g$ may be in a range of from about 25 degrees Celsius to about 100 degrees Celsius. A hard acrylic polymer typically will be a polymer formed by the addition polymerization of a mixture of acrylate or methacrylate esters, or both. The ester portion of these monomers may be $C_1$-$C_6$ alkyl groups, such as, for example, methyl, ethyl, and butyl groups. Methyl esters typically impart “hard” properties, while other esters typically impart “soft” properties. The terms “hard” and “soft” are used qualitatively to refer to room-temperature hardness and low-temperature flexibility, respectively. Soft latex polymers generally have glass transition temperatures below about 0 degrees Celsius. These polymers flow too readily and tend to bond to the fabric when heat and pressure are used to effect transfer. Thus, the glass transition temperature correlates fairly well with polymer hardness.

As used herein, the term “cold release properties” means that once an image has been transferred to a substrate, such as cloth or another heat transfer paper, the backing or carrier sheet may be easily and cleanly removed from the substrate after the heat transfer material has cooled to ambient temperature. That is, after cooling, the backing or carrier sheet may be peeled away from the substrate to which an image has been transferred without resisting removal, leaving portions of the image on the carrier sheet, or causing imperfections in the transferred image coating.

As used herein and in the claims, the term “comprising” is inclusive or open-ended and does not exclude additional unrecited elements, compositional components, or method steps. Accordingly, the term “comprising” encompasses the more restrictive terms “consisting essentially of” and “consisting of.”

DETAILED DESCRIPTION

The present invention relates to heat transfer masking sheet materials and methods of preparation and use thereof.

Referring now to FIG. 1, a heat transfer masking sheet material 10 is shown. The heat transfer masking sheet material 10 includes a backing, or base, layer 11 having a backing layer exterior surface 14, an optional release layer 12 overlaying the backing layer, and a masking layer 13 overlaying the release layer or backing and having a masking layer exterior surface 16. Optionally, the heat transfer masking sheet material 10 may further include a conformable layer (not shown) between the backing layer 11 and the release layer 12 to facilitate the contact between the exterior surface of the masking layer 13 and the substrate to be masked. The use of conformable layers of this type is described in U.S. patent application Ser. No. 09/614,829, filed Jul. 12, 2000, the entirety of which is incorporated herein by reference.

The backing, or base, layer 11 of the heat transfer masking sheet material 10 is flexible and has first and second surfaces. The flexible backing layer typically will be a film or a cellulosic nonwoven web. In addition to flexibility, the backing layer also should have sufficient strength for handling, coating, sheeting, other operations associated with the manufacture of the heat transfer masking sheet material, and for creation and transfer of the mask. The basis weight of the base layer generally may vary from about 30 to about 150 g/$m^2$. By way of example, the backing layer may be a paper such as is commonly used in the manufacture of heat transfer papers. In some embodiments, the backing layer will be a latex-impregnated paper such as described, for example, in U.S. Pat. No. 5,798,179, the entirety of which is incorporated herein by reference. The backing layer is readily prepared by methods that are well known to those having ordinary skill in the art.

The optional release layer 12 of the heat transfer masking sheet material 10 can be fabricated from a wide variety of materials well known in the art of making peelable labels, masking tapes, etc. For example, silicone polymers are very useful and well known. In addition, many types of film forming binders such as acrylics, polyvinylacetates, polystyrenes, polyvinyl alcohols, polyurethanes, polyvinychlorides, as well as many copolymer film forming binders such as ethylene-vinylacetate copolymers, acrylic copolymers, vinyl chloride-acrylics, vinylacetate acrylics, other hard acrylic polymers, and so forth, can be used. The release layer 12 of the heat transfer masking sheet material 10 overlays the first surface of the backing layer opposite the backing layer exterior surface 14.

The thickness of the release coatings is not critical, and may vary considerably depending upon a number of factors including, but not limited to, the backing layer or conformable layer to be coated. Typically, the release coating layer has a thickness less than about 2 mil (51 microns). More desirably, the release coating layer has a thickness from about 0.1 mil (2.5 microns) to about 1.0 mil (25 microns). Even more desirably, the release coating layer has a thickness from about 0.2 mil (5 microns) to about 0.8 mil (20 microns). The thickness of the release coating layer may also be described in terms of a basis weight. Desirably, the release coating layer has a basis weight of less than about 45 g/$m^2$. More desirably, the release coating layer has a basis weight of from about 2 g/$m^2$ to about 25 g/$m^2$. Even more desirably, the release coating layer has a basis weight of from about 2 g/$m^2$ to about 20 g/$m^2$, and even more desirably from about 4 g/$m^2$ to about 20 g/$m^2$.

In one embodiment, the release layer has essentially no tack at transfer temperatures (e.g., 177 degrees Celsius). As used herein, the phrase “having essentially no tack at transfer temperatures” means that the release layer does not stick to the masking layer to an extent sufficient to adversely affect the quality of the transfer of portions of the masking layer. By way of illustration, the release layer may include, for example, a hard acrylic polymer, poly(vinyl acetate), and so forth. As another example, the release layer may include a thermoplastic polymer having a $T_g$ of at least about 25 degrees Celsius. As another example, the $T_g$ may be in a range of from about 25 degrees Celsius to about 100 degrees Celsius. Suitable polymers include, for example, polyacrylates, styrene-butadiene copolymers, ethylene vinyl acetate copolymers, nitrile rubbers, poly(vinyl chloride), poly(vinyl acetate), ethylene-acrylate copolymers, and so forth, which have suitable glass transition temperatures.

In another embodiment, the release layer may include a polymeric film forming binder and a particulate material. The particulate material may be, for example, clay particles, powdered thermoplastic polymers, diatomaceous earth particles, and so forth.

In one embodiment, the release coating layer includes a crosslinked polymer. The cross-linked polymer may be formed from a crosslinkable polymeric binder and a crosslinking agent. The crosslinking agent reacts with the crosslinkable polymeric binder to form a 3-dimensional polymeric structure. Generally, it is contemplated that any pair of polymeric binder and crosslinking agent that reacts to form the 3-dimensional polymeric structure may be utilized. Crosslinkable polymeric binders that may be used are any that may be cross-linked to form a 3-dimensional polymeric structure. Desirable crosslinking binders include those that contain reactive carboxyl groups. Exemplary crosslinking binders that include carboxyl groups include acrylics, polyurethanes, ethylene-acrylic acid copolymers, and so forth. Other desirable crosslinking binders include those that contain reactive hydroxyl groups. Cross-linking agents that can be used to crosslink binders having carboxyl groups include polyfunctional aziridines, epoxy resins, carbodiimide, oxazoline functional polymers, and so forth. Cross-linking agents that can be used to crosslink binders having hydroxyl groups include melamine-formaldehyde, urea formaldehyde, amine-epichlorohydrin, multi-functional isocyanates, and so forth.

In some cases, it may be helpful to add release agents to the release coatings such as soaps, detergents, silicones etc., as described in U.S. Pat. No. 5,798,179. The amounts of such release agents can then be adjusted to obtain the desired release. For example, the release enhancing additive may include a divalent metal ion salt of a fatty acid, a polyethylene glycol, a polysiloxane surfactant, or a mixture thereof. More particularly, the release-enhancing additive may include calcium stearate, a polyethylene glycol having a molecular weight of from about 2,000 to about 100,000, a siloxane polymer polyether, or a mixture thereof.

If desired, the release coating layer may contain other additives, such as processing aids, release agents, pigments, deglossing agents, antifoam agents, surfactants, pH control agents such as ammonium hydroxide, rheology control agents and the like. The use of these and similar materials is well known to those having ordinary skill in the art.

As mentioned above, the masking coating or layer 13 overlays the base layer or the optional release layer. The basis weight of the masking coating generally may vary from about 2 to about 70 g/m$^2$. Desirably, the basis weight of the masking coating may vary from about 20 to about 50 g/m$^2$, more desirably from about 25 to about 45 g/m$^2$, and even more desirably from about 30 to about 35 g/m$^2$. The masking coating includes one or more coats or layers of a film-forming binder such as described above for the optional release layer and a powdered particulate material over the base layer or optional release layer. In general, any film-forming binder may be employed which meets the criteria specified herein. As a practical matter, water-dispersible ethylene-acrylic acid copolymers have been found to be especially effective film-forming binders. The powdered particulate material may be, for example, a mineral such as clay particles, diatomaceous earth particles, talc, calcium carbonate, and so forth, and/or a powdered polymer, pigments, fillers, and so forth. While not wishing to be held to a particular theory, it is believed that the particulate material provides discontinuities in the masking coating so that the masking coating will break cleanly at the edges of the imaged areas. The amount of particulate material can be adjusted so as to provide the desired clean breaking ability while still maintaining enough integrity for converting operations such as sheeting, as well as enough strength to be an effective masking and/or barrier to transfer. The composition of the coats or layers may be the same or may be different. Desirably, the masking coating will include greater than about 5 percent by weight of the film-forming binder and less than about 95 percent by weight of the powdered particulate material, and more desirably the masking coating will include greater than about 8 percent by weight of the film-forming binder and less than about 92 percent by weight of the powdered particulate material. In general, the film-forming binder will melt in a range of from about 65 degrees Celsius to about 180 degrees Celsius. For example, the film-forming binder may melt in a range of from about 80 degrees Celsius to about 120 degrees Celsius. If a powdered thermoplastic polymer is used as the powdered particulate material, the powdered thermoplastic polymer may be any thermoplastic polymer that meets the criteria set forth herein. For example, the powdered thermoplastic polymer may be a polyamide, polyester, ethylene-vinyl acetate copolymer, polyolefin, and so forth. In addition, the powdered thermoplastic polymer may consist of particles that are from about 2 to about 50 micrometers in diameter. As a practical matter, powdered polyamide having particle sizes of about 10 microns has been found to be an especially effective powdered thermoplastic polymer.

In one embodiment, the masking coating layer 13 includes a crosslinked polymer. The cross-linked polymer may be formed from a crosslinkable polymeric binder and a crosslinking agent. The crosslinking agent reacts with the crosslinkable polymeric binder to form a 3-dimensional polymeric structure. Generally, it is contemplated that any pair of polymeric binder and crosslinking agent that reacts to form the 3-dimensional polymeric structure may be utilized. Crosslinkable polymeric binders that may be used are any that may be cross-linked to form a 3-dimensional polymeric structure. Desirable crosslinking binders include those that contain reactive carboxyl groups. Exemplary crosslinking binders that include carboxyl groups include acrylics, polyurethanes, ethylene-acrylic acid copolymers, and so forth. Other desirable crosslinking binders include those that contain reactive hydroxyl groups. Cross-linking agents that can be used to crosslink binders having carboxyl groups include polyfunctional aziridines, epoxy resins, carbodiimide, oxazoline functional polymers, and so forth. Cross-linking agents that can be used to crosslink binders having hydroxyl groups include melamine-formaldehyde, urea formaldehyde, amine-epichlorohydrin, multi-functional isocyanates, and so forth. When the masking coating is cross-linked, the masking coating is inhibited from adhering to a fabric or other substrate while being heat pressed.

If desired, the mask coating layer 13 may contain other additives, such as processing aids, release agents, pigments, deglossing agents, antifoam agents, surfactants, pH control agents such as ammonium hydroxide, rheology control agents and the like. The use of these and similar materials is well known to those having ordinary skill in the art.

As mentioned above, the heat transfer masking sheet material may further include a conformable layer overlaying the base layer and underlying the optional release layer, thereby being located between the base layer and the release layer. In general, the conformable layer may include an extrusion coated polymer that melts in a range of from about 65 degrees Celsius to about 180 degrees Celsius. As an example, the conformable layer may be an extrusion coating of ethylene vinyl acetate. Alternatively, the conformable layer may include a film-forming binder and/or a powdered thermoplastic polymer. The basis weight of the conformable layer generally may vary from about 5 to about 60 g/m$^2$.

If desired, any of the foregoing film layers of the heat transfer masking sheet material may contain other materials, such as processing aids, release agents, pigments, particulates such as kaolin clay or diatomaceous earth, deglossing agents, antifoam agents, pH control agents such as ammonium hydroxide, and so forth. The use of these and similar materials is well known to those having ordinary skill in the art.

The layers applied to the heat transfer masking sheet material that are based on a film-forming binder may be formed on a given layer by known coating techniques, such as by roll, blade, Meyer rod, and air-knife coating procedures. The resulting heat transfer masking sheet material then may be dried by means of, for example, steam-heated drums, air impingement, radiant heating, or some combination thereof. Melt-extruded layers may be applied with an extrusion coater that extrudes molten polymer through a screw into a slot die. The film exits the slot die and flows by gravity onto the underlying layer. The resulting coated material is passed through a nip to chill the extruded film and bond it to the underlying layer. For less viscous polymers, the molten polymer may not form a self-supporting film. In these cases, the material to be coated may be directed into contact with the slot die or by using rolls to transfer the molten polymer from a bath to the heat transfer masking sheet material.

Figure 2A:
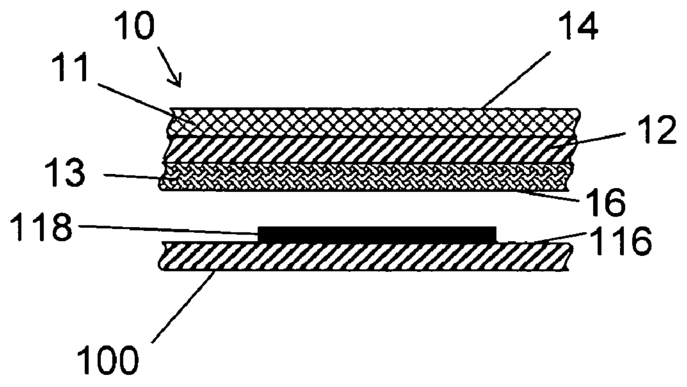
FIGS. 2*a*-2*c* are fragmentary sectional views depicting a method of creating a negative image mask using the heat transfer masking sheet material of FIG. 1.
Figure 2B:
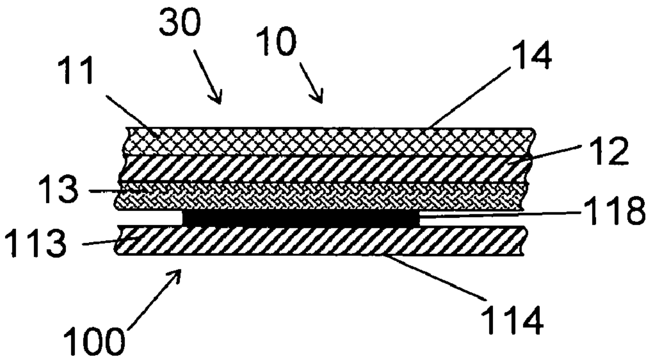
Figure 2C:
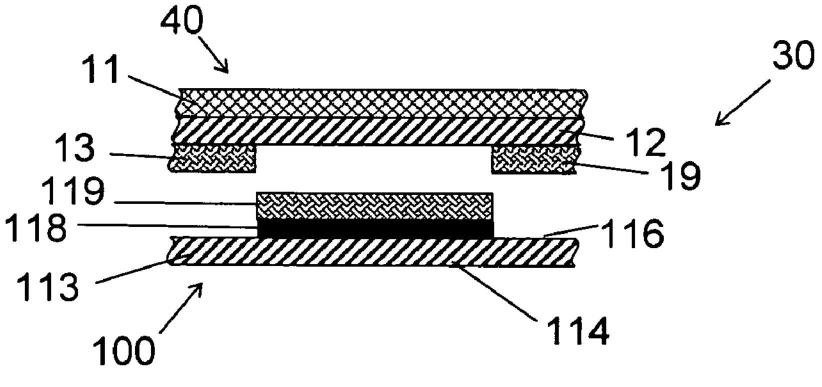

The heat transfer masking sheet material of the present invention may be used in several different methods of applying images to fabrics or other substrate materials. Referring to FIGS. 2*a*-2*c*, an embodiment of a method of creating an image mask using the heat transfer masking sheet material 10 of FIG. 1 is depicted. Referring to FIG. 2*a*, an image 118 is applied to the external surface 116 of a plain sheet material 100 using a standard imaging device (not shown). The plain sheet material 100 may be, for example, any of the backing materials described above, but is desirably a standard sheet of cellulosic paper. Imaging devices compatible with the present invention include, by way of example only, ink jet printers, laser printers and copiers, other toner based printers and copiers, pencils, pens, markers, crayons, and so forth. Desirably, the plain sheet material 100 is imaged with toner from a toner based printer or copier. After imaging of the plain sheet material 100, the imaged plain sheet material is placed directly adjacent the heat transfer masking sheet material 10 with the mask layer 13 facing the image 118.

Referring to FIG. 2*b*, heat and pressure are applied to the backing layer external surface 14 or the non-imaged side 114 of the plain sheet material 100, causing the mask layer 13 to adhere to the image 118 and form a laminate 30. The application of heat and pressure may be effected in a variety of ways known to those skilled in the art. For example, a heat press (not shown) may be used to fuse the layers together. As another example, a standard hand iron (not shown) may be used to apply heat and pressure to the two materials. Desirably, the heat and pressure are applied for an effective period of time to provide good adhesion of the mask layer 13 to the image 118. Desirably, the temperature used to perform the transfer is less than the melting point of any thermoplastic polymer particles in the mask layer 13 so as to prevent the mask layer from melting and forming a continuous film.

Referring to FIG. 2*c*, the imaged plain sheet material 100 is peeled from the fused laminate 30 together with a first mask layer portion 119 overlaying the image 118. A second mask layer portion 19 corresponding to the non-imaged areas on the external surface 116 of the plain sheet material 100 remains on the heat transfer masking sheet material 10, forming a negative image mask 40. Desirably, the imaged plain sheet material 100 is peeled after the mask coating 13 has cooled so as to provide substantially complete transfer or clean separation of the full thickness of the second mask layer portion 119 from the underlying layer. It is also desirable that the detachment force required to separate the second mask layer portion 19 from the underlying layer of the heat transfer masking sheet material 10 is less than the detachment force required to separate the image 118 from the imaged plain sheet material 100.

Figure 3A:
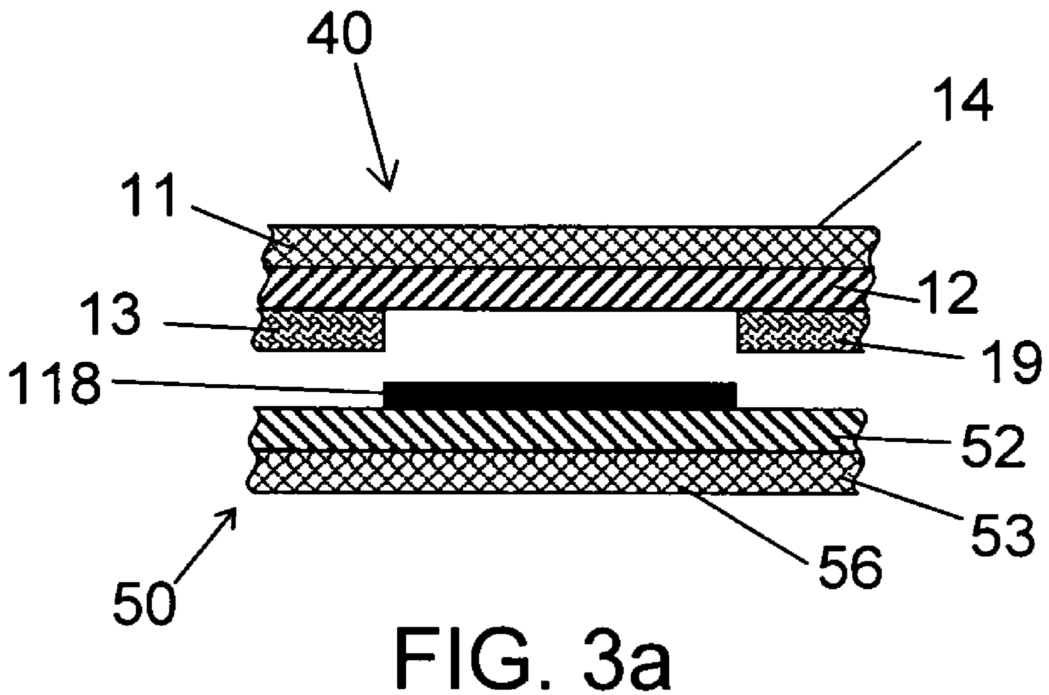
FIGS. 3*a*-3*b* are fragmentary sectional views depicting a method of creating a masked heat transfer sheet material using the negative image mask.
Figure 3B:
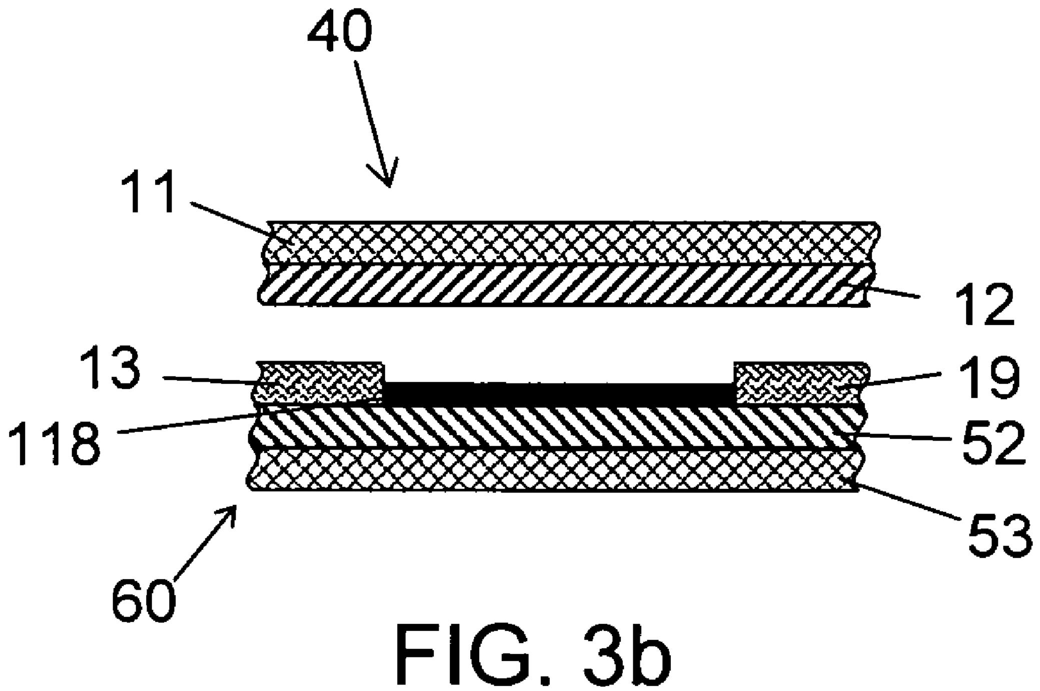

The negative image mask 40 can be used to form images on fabrics or other substrates. In one embodiment, the second mask layer portion 19 on the negative image mask 40 can be transferred to a heat transfer sheet material 50 that includes a transfer layer 52 overlaying a base material 53, as shown in FIGS. 3*a* and 3*b*. The base material 53 may be, for example, any of the backing materials described above, but is desirably a sheet of cellulosic paper. The transfer layer 52 may be, for example, a meltable polymer layer, or other conventional heat transfer layer. Optionally, the transfer layer 52 may be imaged with a copy of the original image 118 used to create the negative image mask 40. The heat transfer sheet material 50 is placed directly adjacent the negative image mask 40 with the second mask layer portion 19 facing the transfer layer 52, taking care to align the optional image 118, if present, with the second mask layer portion 119. Heat and pressure are applied, as described above, to the backing layer external surface 14 or the non-coated side 56 of the base material 53 causing the second mask layer portion 19 to adhere to the transfer layer 52. If the second mask layer portion 19 includes a meltable polymer, the transfer desirably occurs at a temperature low enough to prevent complete melting of the second mask layer portion. However, the transfer may be enhanced if the transfer temperature is sufficiently high to cause the second mask layer portion 19 and/or the transfer layer 52 to become slightly tacky. Separation of the base layer 11 and optional release layer 12 of the negative image mask 40 from the second mask layer portion 19 results in transfer of the second mask layer portion 19 to the heat transfer sheet material 50 to form a masked heat transfer sheet material 60.

Figure 4A:
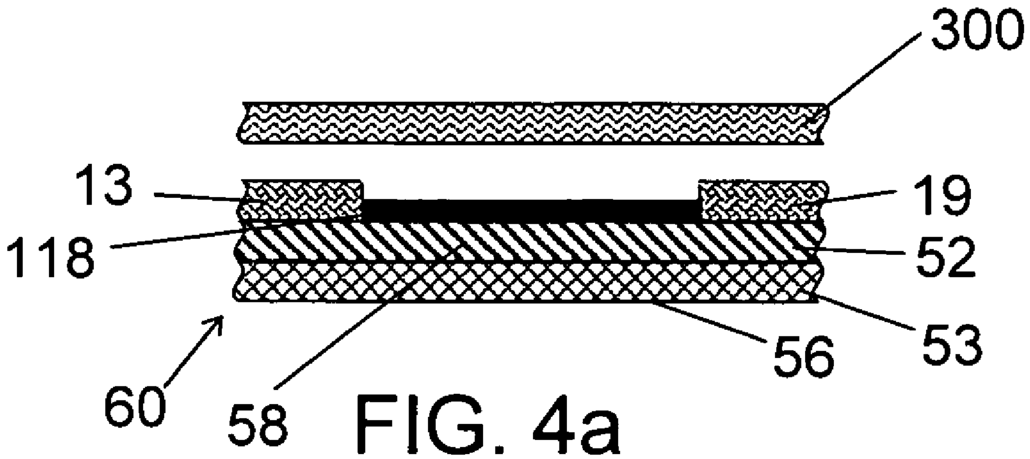
FIGS. 4*a*-4*c* are fragmentary sectional views depicting a method of transferring an image to a substrate using a masked heat transfer sheet material.
Figure 4B:
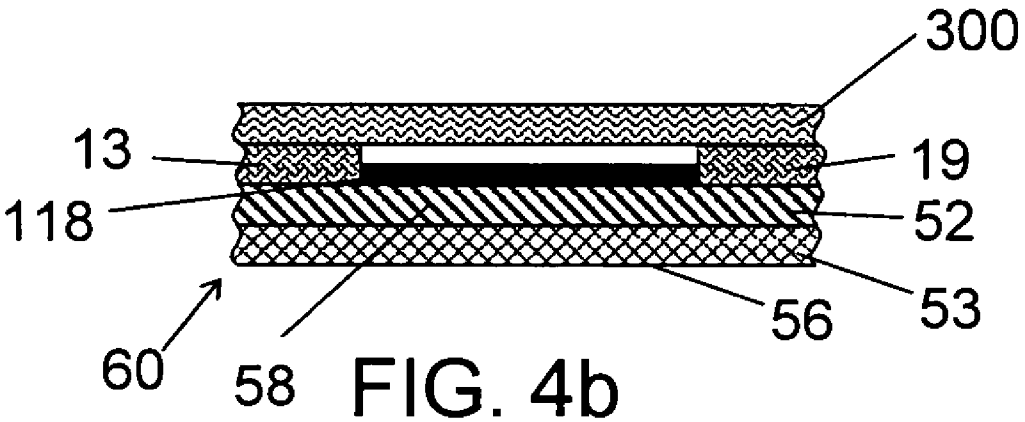
Figure 4C:
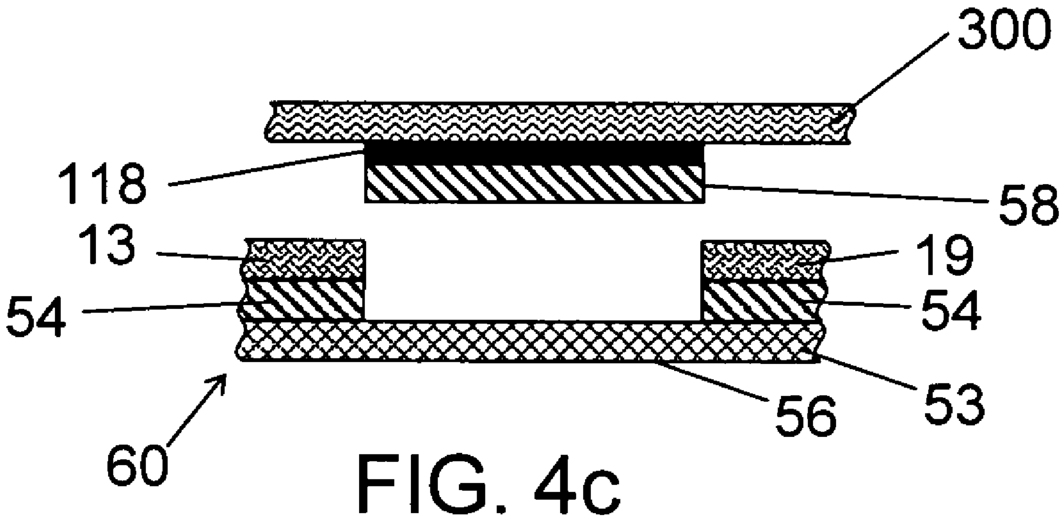

Referring to FIGS. 4*a*-4*c*, the masked heat transfer sheet material 60 can be used to apply an unmasked transfer layer portion 58 of the transfer layer 52 directly to a substrate 300. That is, after masking, the unmasked transfer layer portion 58, i.e., that portion of the transfer layer 52 not covered by the second mask layer portion 19, may be applied directly to a substrate 300. The masked heat transfer sheet material 60 is placed directly adjacent the substrate 300 with the unmasked transfer layer portion 58 facing the substrate. Application of heat and pressure, as described above, to the non-coated side 56 of the base material 53 results in transfer of the unmasked transfer layer portion 58 and the optional image 118, if present, without transfer of a masked transfer layer portion 54 corresponding to and covered by the second mask layer portion 19. If the transfer layer 52 is meltable, the transfer desirably occurs at a temperature above the melting point of the transfer layer to facilitate transfer of the unmasked transfer layer portion 58 to the substrate 300. If the second mask layer portion 19 is meltable, the transfer desirably occurs at a temperature below the melting point of the second mask layer portion to prevent transfer of the second mask layer portion to the substrate 300.

Optionally, a colored image can be created by use of a dye or colorant in the transfer layer 52. For example, the transfer layer 52 can be made opaque and white by pigmentation with titanium dioxide. The use of an opaque and white meltable layer is very useful for applying images to dark materials. In another embodiment, the meltable layer 52 may be a clear polymer. The clear unmasked transfer layer portion 58 may be printed with a mirror image of the original image used to create the negative image mask 40 prior to application of the mask, taking care to carefully register the image on the unmasked transfer layer portion. Then, the mirror image and the unmasked transfer layer portion 58 can be transferred to a substrate as described above.

Figure 5A:
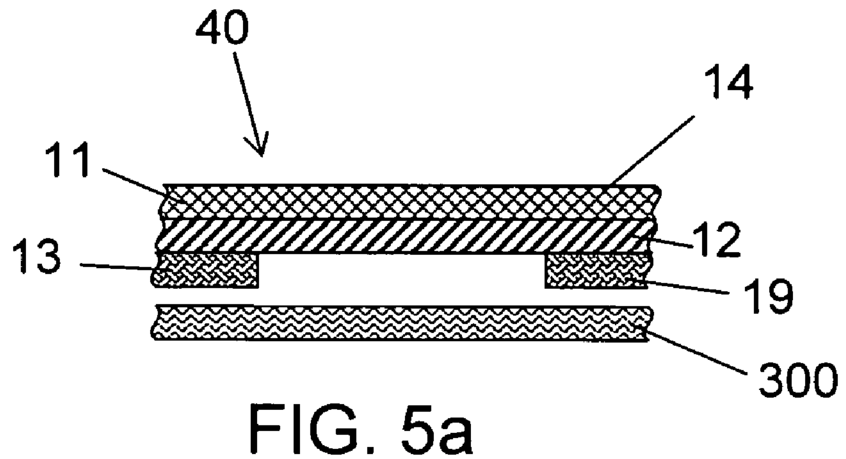
FIGS. 5*a*-5*c* are fragmentary sectional views depicting a method of transferring a negative image mask to a substrate.
Figure 5B:
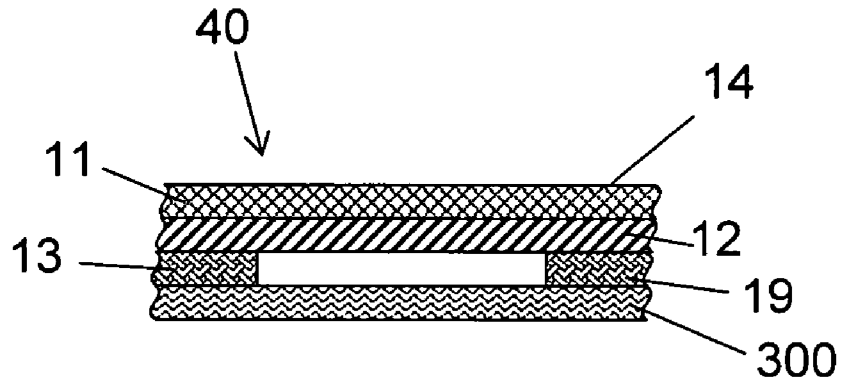
Figure 5C:
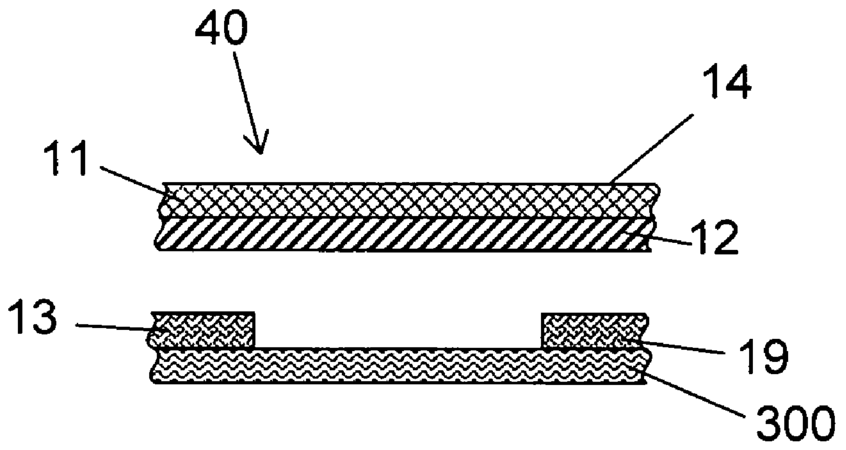

In a further embodiment, the second mask layer portion 19 on the negative image mask 40 may be transferred directly from the negative image mask to a substrate 300 to be imaged. Referring to FIGS. 5*a*-5*c*, the negative image mask 40 is placed directly adjacent the substrate 300 with the second mask layer portion 19 facing the substrate. Application of heat and pressure, as described above, to the backing layer external surface 14 results in transfer of the second mask layer portion 19 to the substrate 300. If the second mask layer portion 19 is meltable, the transfer desirably occurs at a temperature below the melting point of the second mask layer portion 19 to allow the second mask layer portion 19 to removably adhere to the substrate. Additionally and/or alternatively, the second mask layer portion 19 desirably becomes slightly tacky at the transfer temperature to facilitate temporary adhesion to the substrate 300. After removal of the base layer 11 and optional release layer 12, the unmasked area of the substrate 300 may be imaged by any conventional imaging method, for example, painting, coloring, application of a heat transfer, and so forth. As one specific example, a conventional heat transfer paper 50 having an external transfer layer 52 as described above may be used to apply an image to the substrate 300, with the second mask layer portion 19 preventing transfer of extraneous polymer to the substrate where the second mask layer portion is present. The second mask layer portion 19 may then be removed from the substrate 300 to create a substrate imaged only in the desired areas.

A matched set of heat transfer papers and heat transfer masking sheet materials 10 such as described herein may be provided to enable the transfer of printed images to fabrics and other substrates. The matched transfer materials may be provided as a kit in which a supply of both the heat transfer masking sheet material and the heat transfer material may be present in the kit. The heat transfer materials and/or the heat transfer masking sheet materials may be labeled appropriately so as to allow a user to distinguish therebetween. The kit may contain an equal number of the heat transfer papers and heat transfer masking sheet materials. Alternatively, the kit may contain more of the heat transfer materials than the heat transfer masking sheet materials because it is envisioned that it may not be necessary to use a heat transfer masking sheet material with every heat transfer paper.

The present invention may be better understood with reference to the examples that follow. Such examples, however, are not to be construed as limiting in any way either the spirit or scope of the present invention. In the examples, all parts are parts by weight unless stated otherwise.

EXAMPLES

A first heat transfer masking sheet material was made having a base sheet of cellulosic fiber paper having a basis weight of 90 g/m$^2$ (Supersmooth Classic Crest available from Neenah Paper, Inc., Alpharetta, Ga.). A conformable layer of a 6 g/m$^2$ film of ethylene vinyl acetate (available as Elvax 3200 from DuPont Corporation of Wilmington, Del.) was extrusion coated on a surface of the base sheet. Overlaying the conformable layer was a release layer that included a mixture of 100 dry parts of hard acrylic latex (available as Rhoplex SP-100 from Rohm & Haas), 1 part of 28% ammonium hydroxide solution (available from EM Industries), 5 dry parts of aziridine crosslinking agent (available as XAMA 7 from Sybron Chemicals, Inc. of Birmingham, N.J.), 3 dry parts of nonionic surfactant (available as Triton X100 from The Dow Chemical Company), and 10 dry parts of 8000 molecular weight polyethylene oxide (available as Carbowax 8000 from The Dow Chemical Company) coated on the base substrate as an aqueous dispersion and dried to a basis weight of 6.5 g/m$^2$. Overlaying the release layer was a masking layer that included a mixture of 100 dry parts of powdered polyamide (10 micron average particle size) (available as Orgasol 3501 EXD NAT 1 from Atofina Chemicals Inc.), 40 parts of cyclohexane dimethanol dibenzoate, ground to an average particle size of 8 microns (available as Benzoflex 352 from Velsicol Chemical Corporation of Rosemont, Ill.), 70 dry parts of ethylene acrylic acid dispersion (available as Michem Prime 4983 from Michelman Inc.), 5 dry parts of nonionic surfactant (available as Triton X100 from The Dow Chemical Company), and 2 dry parts of aziridine crosslinking agent (available as XAMA 7 from Sybron Chemicals, Inc.) coated on the underlying layer as a 30% solids content aqueous dispersion and dried to a basis weight of 32 g/m$^2$.

A plain piece of 90 g/m$^2$ paper (available as Digital Color Expressions 94 from Xerox Corporation) was used to create the image mask. The plain paper was imaged with a multicolor image by a color laser printer (Canon 700, available from Canon). The first transfer step with the imaged paper against the removable masking was done in a heat press for 30 seconds at about 138 degrees Celsius. After cooling and separation, the masking had transferred to only the imaged areas of the plain paper, thereby leaving a negative image mask on the heat transfer masking sheet material.

Three different heat transfer materials were used in conjunction with the negative image masks. A first heat transfer material had a base sheet of a cellulosic fiber paper having a basis weight of 90 g/m$^2$ (Avon Bond available from Neenah Paper, Inc.) extrusion coated with a white, opaque 4.0 mil film of a blend of 100 dry parts ionomer resin (available as Surlyn 1702 from DuPont Corporation) and 30 dry parts titanium dioxide concentrate (available as White Cap 11200 from Ampacet). The negative image mask was transferred to the first heat transfer material in a heat press at 280 degrees F. for 30 seconds. Upon separation of the papers, the masking had transferred to the white opaque layer of the first heat transfer material. After masking, the white image on the first heat transfer material was transferred to a black, 100% cotton Tee shirt material. The result was a white image on the black fabric which withstood 10 wash and dry cycles with no noticeable change.

A second heat transfer material had a base sheet of a cellulosic fiber paper having a basis weight of 90 g/m$^2$ (Avon Bond available from Neenah Paper, Inc.) extrusion coated with a white, opaque 4.0 mil film of a blend of 70 dry parts ethylene vinyl acetate (available as Elvax 3200 from DuPont Corporation) and 30 dry parts titanium dioxide concentrate (available as White Cap 11200 from Ampacet). The negative image mask as described above was transferred to the second heat transfer material in a heat press at 280 degrees F. for 30 seconds. Upon separation of the papers, the masking had transferred to the white opaque layer of the second heat transfer material. After masking, the white image on the second heat transfer material was transferred to a black, 100% cotton Tee shirt material. After the transfer, the second heat transfer paper was easy to remove from the Tee shirt. The result was a white image on the black fabric that was softer than the image created with the first heat transfer paper. After 10 wash and dry cycles, there was no loss of opacity or whiteness, but some cracks developed in the white image.

A third heat transfer material had a base sheet of cellulosic fiber paper having a basis weight of 90 g/m$^2$ (Supersmooth Classic Crest available from Neenah Paper, Inc., Alpharetta, Ga.). A first layer of a 1.2 mil film of a 50/50 blend of ethylene vinyl acetate (available as Bynel 11124, available from DuPont) and an ethylene-methacrylic acid copolymer (available as Nucrel 599, available from DuPont) was extrusion coated on a surface of the base sheet. An outer layer of 51% ethylene vinyl acetate (available as Bynel 1124 from DuPont), 47% ethylene-methacrylic acid copolymer (available as Nucrel 599 from DuPont), 1% slip agent, ethylene bis(stearamide), (available as Advawax 240, available from Morton Thiokol), and 1% antistat (available as Atmer190, available from Uniqema). An image identical to the image printed onto the "plain paper" was printed onto the third heat transfer material using a Canon 700 color copier. Then, the negative image mask was applied to the third heat transfer material, using care to align the image exactly, so that the masking covered only the non-imaged areas. The lamination of the negative image mask to the third heat transfer material was completed using a heat press for 30 seconds at 280 degrees F. After separation, the masking had transferred to the third heat transfer paper in the non-imaged areas. The masked third heat transfer paper was then heat pressed for 30 seconds at 280 degrees F. to a 100% cotton white Tee shirt material. The result was a full color image with no polymer in the background areas after removal of the paper. The transfer withstood washing as well as an unmasked transfer made with the same heat transfer paper.

All wash tests were done using Tide detergent in a commercial washing machine (Unimat model 18 available from Unimat Corporation) at a medium soil setting. Drying was done in a heavy duty, large capacity, electric Kenmore drier.

It should be appreciated by those skilled in the art that various modifications or variations can be made in the invention without departing from the scope and spirit of the invention. It is intended that the invention include such modifications and variations as come within the scope of the appended claims and their equivalents.

What is claimed is:

1. A method of applying an image to a substrate, the method comprising the steps of:

a) imaging a printable surface with an image to form an imaged surface having a printed area and a non-printed area;

b) positioning a masking sheet comprising an outer masking layer adjacent the imaged surface such that the outer masking layer is in contact with the imaged surface;

c) transferring a corresponding portion of the outer masking layer to the printed area of the imaged surface, leaving a negative image mask on the masking sheet;

d) transferring the negative image mask to a transfer layer of a heat transfer paper to form a heat transfer paper having a masked portion of the transfer layer corresponding to the negative image mask and an unmasked portion of the transfer layer corresponding to the image; and e) transferring the unmasked portion of the transfer layer to a substrate.

2. The method of claim 1, wherein the transfer layer of the heat transfer paper is imaged with a copy of the image prior to transfer of the negative image mask to the transfer layer, further wherein the image is aligned with the unmasked portion of the transfer layer.

3. The method of claim 1, wherein the transferring steps are performed by application of heat and pressure.

4. The method of claim 3, wherein the application of heat and pressure is performed by hand ironing.

5. The method of claim 3, wherein the application of heat and pressure is provided by a heat press.

6. The method of claim 1, wherein the imaging step is performed by application of toner particles by laser-jet copier or laser-jet printer.

7. The method of claim 1, wherein the printable surface is the surface of a piece of paper.

8. The method of claim 1, wherein the outer masking layer comprises a powdered particulate material.

9. The method of claim 8, wherein the powdered particulate material is selected from the group consisting of powdered thermoplastic polymers, clay, and diatomaceous earth.

10. The method of claim 8, wherein the powdered particulate material comprises powdered thermoplastic polymer particles.

11. The method of claim 10, wherein the step of transferring a corresponding portion of the outer masking layer to the printed area of the imaged surface, leaving a negative image mask on the masking sheet is performed at a temperature below the melting point of the thermoplastic particles.

12. The method of claim 10, wherein the step of transferring the negative image mask to a transfer layer of a heat transfer paper to form a heat transfer paper having a masked portion of the transfer layer corresponding to the negative image mask and an unmasked portion of the transfer layer is performed at a temperature below the melting point of the thermoplastic particles.

13. The method of claim 1, wherein the transfer layer of the heat transfer paper comprises a meltable polymer.

14. A method of applying an image to a substrate, the method comprising the steps of:

a) imaging a printable surface with an image to form an imaged surface having a printed area and a non-printed area;

b) positioning a masking sheet comprising an outer masking layer adjacent the imaged surface such that the outer masking layer is in contact with the imaged surface;

c) transferring a corresponding portion of the outer masking layer to the printed area of the imaged surface, leaving a negative image mask on the masking sheet;

d) transferring the negative image mask to a clear transfer layer of a heat transfer paper to form a heat transfer paper having a masked portion of the transfer layer corresponding to the negative image mask and an unmasked portion of the transfer layer corresponding to the image;

e) imaging the unmasked portion of the transfer layer with a copy of the image; and f) transferring the imaged unmasked portion of the transfer layer to a substrate.

15. The method of claim 14, wherein the transferring steps are performed by application of heat and pressure.

16. The method of claim 15, wherein the application of heat and pressure is performed by hand ironing.

17. The method of claim 15, wherein the application of heat and pressure is provided by a heat press.

18. The method of claim 14, wherein the imaging of either or both step a) or step e) is performed by laser-jet copier or laser-jet printer.

19. The method of claim 14, wherein the printable surface is the surface of a piece of paper.

20. The method of claim 14, wherein the outer masking layer comprises powdered thermoplastic polymer particles.

21. The method of claim 20, wherein the step of transferring a corresponding portion of the outer masking layer to the printed area of the imaged surface, leaving a negative image mask on the masking sheet is performed at a temperature below the melting point of the powdered thermoplastic polymer particles.

22. The method of claim 20, wherein the step of transferring the negative image mask to a clear transfer layer of a heat transfer paper to form a heat transfer paper having a masked portion of the transfer layer corresponding to the negative image mask and an unmasked portion of the transfer layer corresponding to the image is performed at a temperature below the melting point of the thermoplastic particles.

23. The method of claim 14, wherein the imaging steps are performed by application of toner particles by a laser-jet copier or a laser-jet printer.

* * * * *